United States Patent [19]

Tam

[11] Patent Number: 5,521,954
[45] Date of Patent: May 28, 1996

[54] METHOD AND APPARATUS FOR IMPROVED ACCURACY IN COMPUTED TOMOGRAPHY CONE-BEAM IMAGING

[75] Inventor: Kwok C. Tam, Schenectady, N.Y.

[73] Assignee: General Electric Company, Schenectady, N.Y.

[21] Appl. No.: 392,004

[22] Filed: Feb. 21, 1995

[51] Int. Cl.$^6$ ........................................................ A61B 6/03
[52] U.S. Cl. ........................... 378/8; 378/901; 364/413.16
[58] Field of Search ........................... 364/413.16; 378/4, 378/8, 901

[56] References Cited

U.S. PATENT DOCUMENTS

| | | | |
|---|---|---|---|
| 5,257,183 | 10/1993 | Tam | 364/413.19 |
| 5,390,111 | 2/1995 | Tam | 364/413.14 |

*Primary Examiner*—David P. Porta
*Assistant Examiner*—David Vernon Bruce
*Attorney, Agent, or Firm*—Paul R. Webb, II

[57] ABSTRACT

A system is provided for improving the operation of a computed tomography system in forming an image of an object, wherein a cone-beam source is employed to project an image of the object onto a detector plane to provide a set of cone-beam projection data, and such data is to be converted into a set of Radon data for use in constructing the desired image. In the invention, a line L' is rotated in the detector plane from a line L about a center of rotation which lies on the line L, so that L' lies at a small angle with respect to line L. Data from the cone-beam projection data set is respectively integrated along the first and second lines to generate first and second weighted line integrals respectively corresponding to the lines L and L' The two weighted line integrals are then employed to find the derivative of one of the data points in the Radon data set. The above process is repeated as required to determine each Radon derivative, from which respective data points in the Radon data set can be computed, for use in constructing an image. To avoid inaccuracies arising in determining Radon derivatives in regions proximate to the edge of the projected image, the center of rotation for each line L having a portion which intersects the projected image is positioned on said portion.

10 Claims, 4 Drawing Sheets

METHOD AND APPARATUS FOR IMPROVED ACCURACY IN COMPUTED TOMOGRAPHY CONE-BEAM IMAGING

BACKGROUND OF THE INVENTION

The invention disclosed and claimed herein generally pertains to a method and apparatus for improving accuracy in computed tomography (CT) cone-beam imaging. More particularly, the invention pertains to such method and apparatus wherein x-ray projection data is converted to Radon planar integral data. Even more particularly, the invention pertains to reducing distortion in computing the Radon derivative proximate to the edge or boundary region of a projected image.

One of the most important techniues currently used in constructing a CT image of an object is based on the Radon transform. This technique is of particular importance in three-dimensional (3D) CT imaging. According to such technique, a cone-beam x-ray source irradiates the object to project an image of the object, in the form of cone-beam x-ray data, on to a detector plane. A two-step process is then performed, wherein the cone-beam data is converted into a set of Radon data, or planar integrals defined in Radon space, and an inverse Radon transform is performed using the planar integrals to construct the image. It is known that this process is most usefully carried out by computing the radial derivative (Radon derivative) for each planar integral in the set, from which the values of respective planar integrals can be readily determined.

Commonly assigned U.S. Pat. No. 5,257,183, issued Oct. 26, 1993 to Kwok C. Tam, the inventor named herein, discloses a very efficient technique for computing the Radon derivatives for use in the above process. Such patent teaches a method wherein a given planar integral is taken in a plane Q, the plane Q being extended to intersect the normalized detector plane along a line L. A line L' is then rotated in the detector plane from the line L, so as to lie at a small angle $\alpha$ with the line L. The cone-beam data lying along the lines L and L' is integrated to generate respective corresponding weighted line integrals J and J'. The Radon derivative for the given planar integral is then calculated from the difference between the weighted line integrals, divided by an angle $\beta$, which is geometrically related to the small angle of rotation $\alpha$. More particularly, $\beta$ is the angle between the plane Q and the plane Q', which intersects the detector plane along line L', and is rotated from plane Q about an axis which intersects the line L at a point C. Hereinafter, the point C is referred to as the center of rotation. The relationship between angle $\alpha$ and angle $\beta$ is clearly and completely set forth in U.S. Pat. No. 5,257,183, referred to above. Thus, if R' is the Radon derivative for a given planar integral, $R'=(J-J')/\beta$ While the Radon derivative method described above works quite well, there is a concern with possible inaccuracy with respect to regions close to the edge of the projected image. Since the method requires taking the difference between weighted line integrals along two spaced apart lines on the detector plane, a discontinuity could be encountered between the lines. For example, the line L could intersect the projected image close to the edge thereof, but the line L' would be rotated to a position such that it did not intersect the image at all.

SUMMARY OF THE INVENTION

In accordance with the invention, an image of an object is projected on to a normalized detector plane by a cone-beam x-ray source to provide a set of cone-beam projection, or line integral, data. To convert the cone-beam data into a set of planar integral or Radon derivatives for use in constructing a CT image of the object, a plane Q, associated with a given one of the Radon derivatives, is extended to intersect the detector plane along a first line. A point is selected on the first line which lies on a portion of the first line which intersects the image projected onto the detector plane. A second line lying in the detector plane is rotated about the selected point to lie at a small specified first angle with respect to the first line. Cone-beam projection data is respectively integrated along the first and second lines to generate first and second weighted line integrals, respectively corresponding to the first and second lines. The difference between the first and second line integrals is divided by a second angle, geometrically related to the first angle, to provide the given Radon derivative.

The procedure set forth above is repeated as required, to compute each of the remaining Radon derivatives in the derivative set. It is to be understood that if any plane Q intersects the detector plane along a first line which does not have any portion intersecting the projected image, the associated Radon derivative will have a zero value.

Preferably, the selected point for a given first line is located at the position of the centroid of the given first line, with respect to the image projected on to the detector plane.

The invention also provides apparatus for generating the 3-D CT image of an object, such apparatus including an x-ray cone-beam source and an associated planar detector for providing a set of cone-beam projection data, or line integrals, which corresponds to a set of planar integrals in Radon space. The apparatus further includes means for defining a plane associated with each of the planar integrals, and, each of the planes, for extending the plane to intersect the detector plane along a first line, means for selecting a rotation point on any portion of the first line which intersects the image projected onto the plane of the detector, and means for rotating a second line in the detector plane from the first line, by a small specified first angle and about a center of rotation comprising the selected point. The apparatus further includes means for respectively integrating along the first and second lines to generate first and second weighted line integrals, respectively corresponding to the first and second lines, and means for dividing the difference between the first and second weighted line integrals by a second angle geometrically related to the first angle, to provide the Radon derivative of the corresponding planar integral. Means are provided for computing respective planar integral values therefrom, and for performing an inverse Radon transform on respective planar integral values to construct an image of the object.

An object of the invention is to improve accuracy in an arrangement for CT cone-beam source imaging which requires computation of the derivatives of the planar integrals, comprising a set of Radon data.

Another object is to provide an arrangement of the above type which avoids errors arising from discontinuities in Radon derivative computation, and improves the accuracy of imaging proximate to boundary regions of a projected image.

These and other objects of the invention will become more readily apparent from the ensuing specification, taken together with the accompanying drawings.

DETAILED DESCRIPTION OF THE PREFERRED EMBODIMENT

Figure 1:
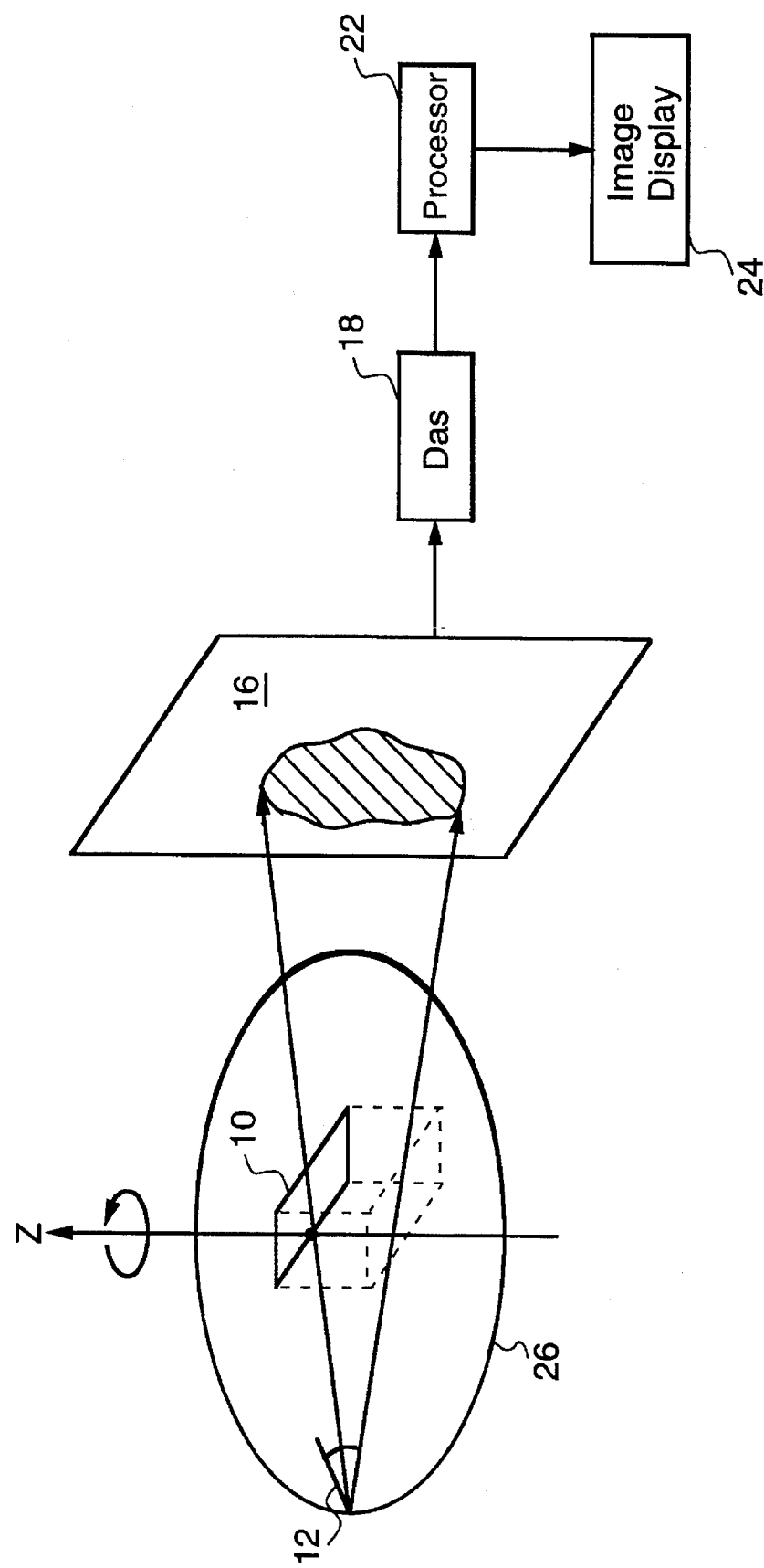
FIG. 1 is a schematic drawing illustrating the basic components of a cone-beam CT imaging system.

Referring to FIG. 1, there are shown the principal components of a cone-beam CT imaging system for reconstructing and displaying an image of an object 10. A cone-beam x-ray source 12 is positioned to irradiate object 10, to project data representing an image thereof onto an associated detector array 14, having a planar detector surface 16. As is known in the art, detector array 14 comprises a matrix array of discrete detectors (not shown). Projected data is in the form of x-ray photons that penetrate the object and are sensed by the respective x-ray detectors of array 14. Array 14 is coupled to a Data Acquisition System (DAS) 18, which processes respective photon counts, in a manner well known in the art, to provide cone-beam projection data in the form of a set of line integrals representing the image 20 projected onto detector plane 16.

Referring further to FIG. 1, there is shown DAS 18 coupled to a processor 22, which receives the cone-beam projection data from DAS 18 and operates in accordance with the invention, as described herein, to convert the projection data into a set of Radon derivatives. The processor is further structured to compute a set of planar integral values from the Radon derivatives, and to perform an inverse Radon transform to reconstruct an image of the object, employing such set of planar integral values as input data therefor. The reconstructed image is coupled from processor 22 for display by means of image display device 24.

FIG. 1 further shows cone-beam source 12 moveable with respect to object 10 around a scan-path 26. In a typical arrangement, detector array 14 is constrained to move with source 12, so that object 10 remains positioned therebetween. Cone-beam projection data is acquired by detector 14 for successive positions of source 12 as source 12 traverses its trajectory 26.

Figure 2A:
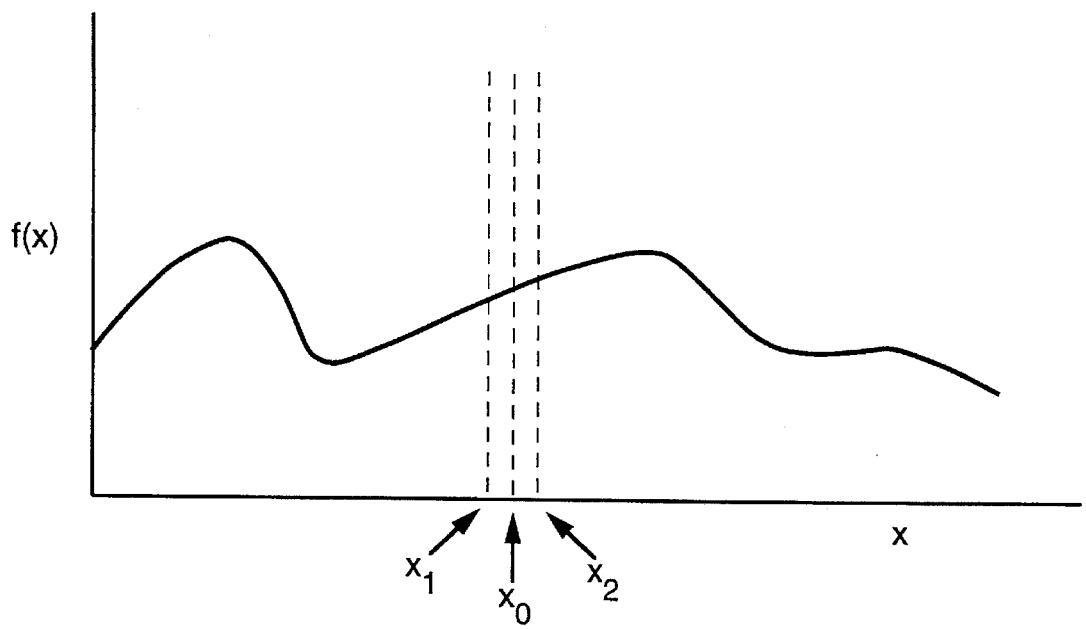
FIGS. 2a, 2b, 3 and 4 are diagrams collectively illustrating a potential source of inaccuracy in prior art CT imaging which is addressed by the invention.
Figure 2B:
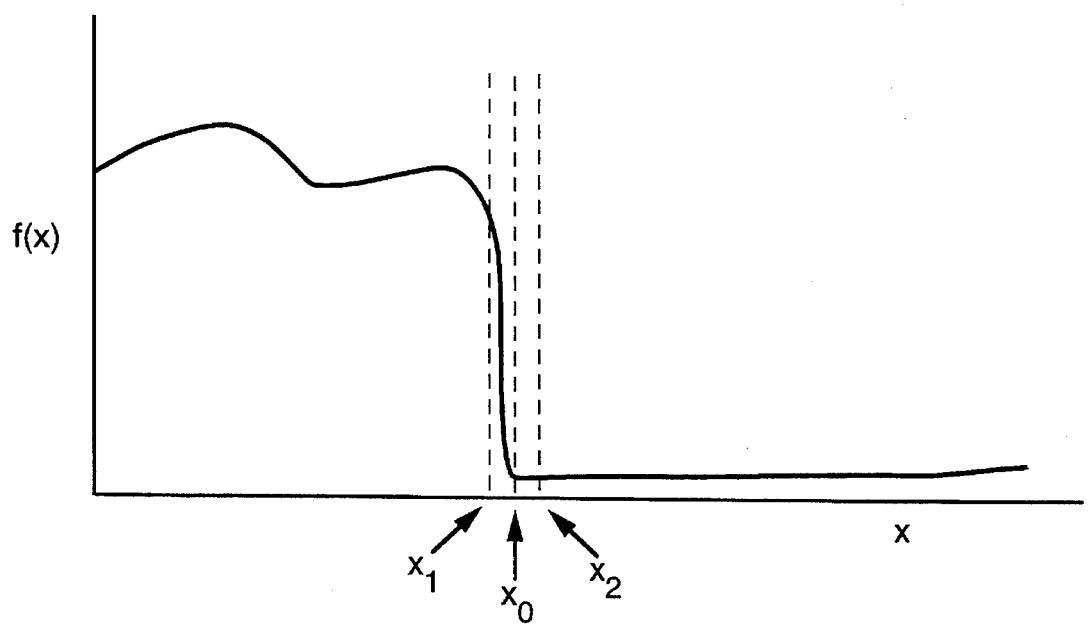

FIGS. 2A and 2B are provided to generally illustrate the discontinuity problem addressed by the invention. FIG. 2A shows a one dimensional function f(x), it being desired to compute the derivative of the function at the point x=x0. A very close approximation to the derivative can be obtained from the expression $\eta(x0)=\eta(x2)-\eta(x1)/(x2-x1)$, where x1 and X2 are two points closely bordering x0 from the left and right, respectively. Such expression yields a very accurate estimate of $\eta(x0)$, because the interval between x1 and x2 is very small, and the function $\eta(x)$ is approximately linear in such interval. Referring to FIG. 2B, however, it is seen that such expression does not provide an accurate estimate of $\eta'(x0)$ at the point x=x0. The linearity condition fails, since the point x0 is close to a discontinuity of the function $\eta(x)$, and the discontinuity lies between the two bordering points x1 and x2. The function $\eta(x)$ is clearly non-linear within such interval.

Figure 3:
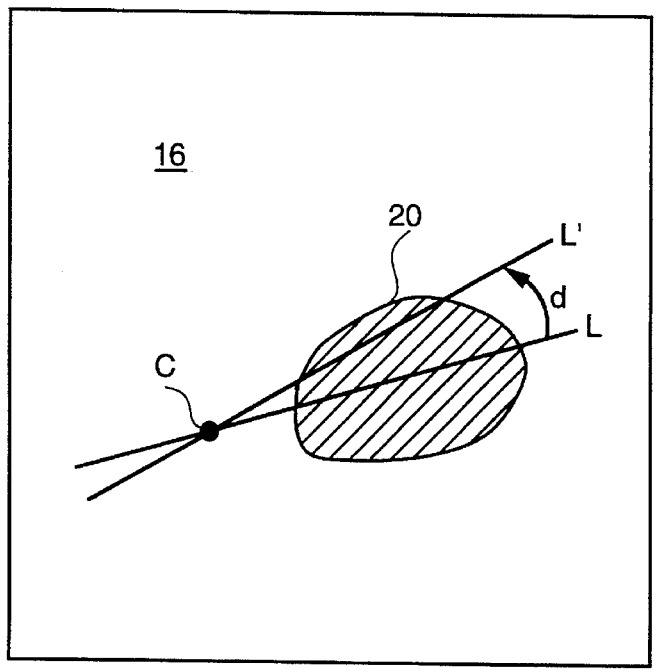

Referring to FIG. 3, there is shown line L' rotated from line L by an angle $\alpha$, to generate respective line integrals J and J', in accordance with the prior art technique described above. According to such technique, the center of rotation C of line L' with respect to line L is arbitrarily located, and may lie anywhere on the detector plane 16. Therefore, it is likely that the rotation center C will lie outside of and not coincide with, the projected image 20, as shown in FIG. 3.

As stated above, the Radon derivative R' is calculated from the expression $R'=(J-J')/\beta$. For the situation shown in FIG. 3, lines L and L' both have portions which intersect the projected image 20. Accordingly, the weighted line integral values J and J' respectively computed therefrom will be close enough in value that the variation therebetween may be presumed to be linear. It is therefore valid to compute the Radon derivative R' from the expression $R'=(J-J')/\beta$, stated above.

Figure 4:
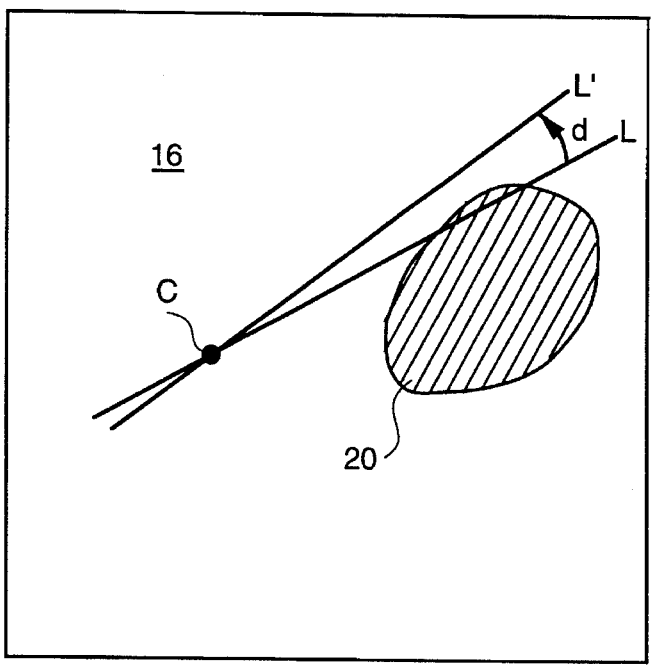

Referring to FIG. 4, there is shown a situation wherein the rotation center C again lies outside of the projected image 20, in like manner with FIG. 3. In FIG. 4, however, the line L intersects the image 20 very close to the edge or boundary region thereof. Thus, when the line L' is rotated about the point C by the angle, it will not have any portion which intersects the image 20. Accordingly, a discontinuity will occur between the weighted line integrals J and J' along the respective lines L and L' shown in FIG. 4. It therefore cannot be presumed that the variation between such values of J and J' is linear over the interval therebetween, and the expression for the Radon derivative R', set forth above, is not valid.

Figure 5:
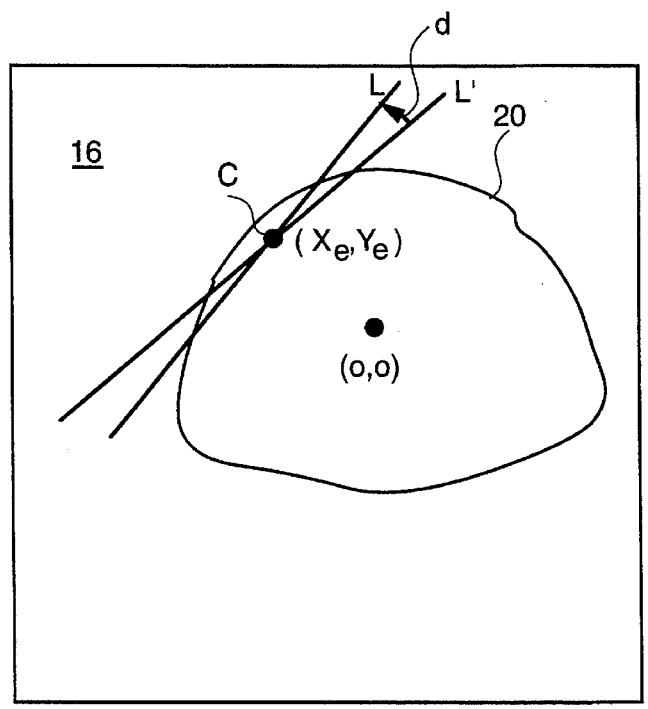
FIG. 5 is a diagram illustrating an embodiment of the invention.

To avoid this problem, FIG. 5 shows a line L intersecting the projected image 20 on detector plane 16, wherein the center of rotation C for the line L' is positioned to coincide with the centroid of the line L. As is known, the centroid of the line L is the location where the image value on the line concentrates. If the origin of an x-y coordinate system lying in the detector plane 16 is located at the position (o,o) shown in FIG. 5, the centroid for the line L has the coordinates ($X_c$, $Y_c$) in such coordinate system, wherein $X_c$ and $Y_c$ are given by the following equations:

$$X_c = \frac{\sum_i x_i\, p(x_i, y_i)}{\sum_i p(x_i, y_i)} \quad (1)$$

$$Y_c = \frac{\sum_i y_i\, p(x_i, y_i)}{\sum_i p(x_i, y_i)} \quad (2)$$

In each of the above equations, p(x, y) is the value of the cone-beam data projected on to detector plane 16 at a point (x, y), lying along the line L.

It has been found that the centroid position for the line L generally will always lie on the portion of line L which intersects or falls within the cone-beam image 20. Accordingly, any line L' rotated from line L about a rotation center C positioned at the centroid will also have a portion intersecting the cone-beam image 20, even if the line L intersects the image 20 only in a region which is close to the edge thereof. Accordingly, the discontinuity problem described above will be avoided.

Figure 6:
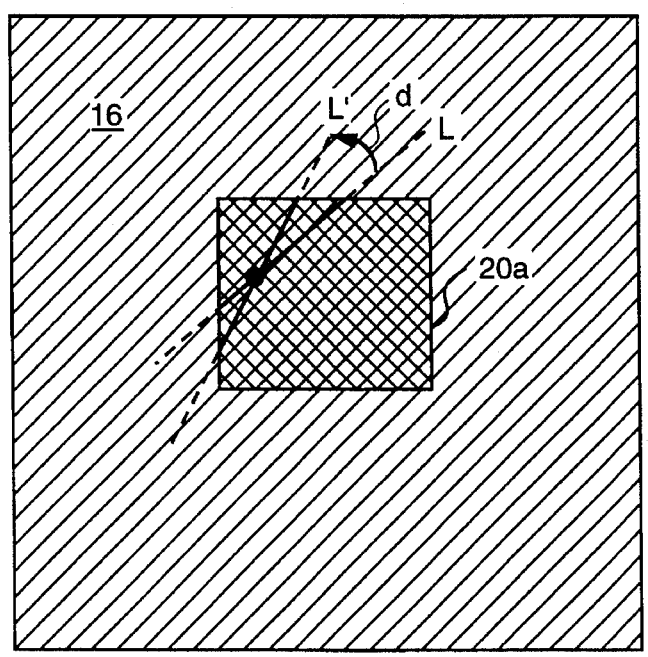
FIG. 6 is a diagram illustrating a modification of the embodiment shown in FIG. 5.

Referring to FIG. 6, there is shown a projected image 20a on detector plane 16, which is the image of a regular shaped object such as a manufactured component or part which is being inspected by the CT system in connection with FIG. 1 described above. For such regular shaped part, the location or region of support of the image thereof on the detector plane 16, the region of support of the cone-beam projection, can be estimated quite accurately for each view angle. Thus, for a given view angle, the center of rotation C for a line L is selected to be at any position along the portion of line L lying within the estimated region of support. This may be achieved by masking the detector plane 16, except for such region of support.

The embodiments described above, while important, are not intended to limit the scope of the invention. If other techniques were used to insure that the rotation center C for a line L is always positioned within the projected image, such techniques would generally also provide the benefits realized from the invention, as described above. Accordingly, such techniques would be within the scope of the invention.

Obviously, many other modifications and variations of the present invention are possible in light of the above teachings. It is therefore to be understood that within the scope of the disclosed inventive concept, the invention may be practiced otherwise than as specifically described.

What is claimed is:

1. In a computed tomography system wherein an image of an object is projected onto a detector plane by a cone-beam source to provide a set of cone-beam projection data, a method for converting said projection data into a set of Radon derivatives for use in constructing an image of said object, said method comprising the steps of:

(a) defining a plane associated with a given one of said Radon derivatives, and extending said plane to intersect said detector plane along a first line;

(b) selecting a point lying on any portion of said first line which intersects said image projected onto said detector plane;

(c) rotating a second line in said detector plane about said selected point to lie at a small specified first angle with respect to said first line;

(d) respectively integrating data from said set of cone-beam projection data along said first and second lines, to generate first and second weighted line integrals respectively corresponding to said first and second lines;

(e) dividing the difference between said first and second weighted line integrals by a small second angle geometrically related to said first angle to provide said given Radon derivative; and (f) repeating each of the above steps (a)–(e) to provide each of the remaining Radon derivatives in said Radon derivative set.

2. The method of claim 1 wherein:

said method includes the step of assigning a zero value to each Radon derivative in said derivative set associated with a first line which does not have any portion intersecting said projected image.

3. The method of claim 2 wherein said method includes the steps of:

for a given first line having a portion intersecting said projected image, determining the position of the centroid of said given first line with respect to said projected image; and locating the selected point corresponding to said first line at said centroid position.

4. The method of claim 2 wherein said method includes the steps of:

estimating the region of support of said projected image on said detector plane for a given view angle of said computed tomography system; and locating said selected point to lie on a portion of said first line which is included in said region.

5. A method for forming a computed tomography image of an object comprising:

(a) operating an x-ray cone-beam source to irradiate an object and to project an image of the object onto an associated detector plane to provide a set of cone-beam projection data, said projection data corresponding to a set of planar integrals in Radon space;

(b) defining a plane associated with a given one of said planar integrals, and extending said plane to intersect said detector plane along a first line;

(c) selecting a rotation point to lie on any portion of said first line which intersects said image projected onto said detector plane;

(d) rotating a second line from said first line in said detector plane and about said rotation point to form a small specified first angle with said first line;

(e) respectively integrating data from said set of cone-beam projection data along said first and second lines, to generate first and second weighted line integrals, respectively corresponding to said first and second lines;

(f) dividing the difference between said first and second weighted line integrals by a second angle geometrically related to said first angle to provide the Radon derivative of said given planar integral;

(g) repeating each of the above steps (b)–(f) to provide the Radon derivative for each of the remaining planar integrals in said set;

(h) computing respective values of said planar integrals in said planar integral set from said Radon derivatives; and (i) using said planar integral values to perform inverse Radon transform to construct an image of said object.

6. The method of claim 5 wherein said method includes the steps of:

for a given first line having a portion intersecting said projected image, determining the position of the centroid of said given first line with respect to said projected image; and locating the selected point corresponding to said first line at said centroid position.

7. The method of claim 5 wherein said method includes the steps of:

estimating the region of support of said projected image on said detector plane for a given view angle of said computed tomography system; and selecting said rotation point to lie on a portion of said first line which is included in said region.

8. Apparatus for forming a computed tomography image of an object comprising:

a detector having a detecting surface comprising a detector plane;

an x-ray cone-beam source operated to irradiate said object and to project an image of the object onto said detector plane to provide a set of cone-beam projection data, said projection data corresponding to a set of planar integrals in Radon space;

means for defining a plane associated with each of said planar integrals, and for each of said planes, extending said plane to intersect said detector plane along a first plane to intersect said detector plane along a first line;

means for selecting a rotation point lying on any portion of said first line which intersects said image projected onto said detector plane;

means for rotating a second line from said first line in said detector plane and about said rotation point to form a small specified first angle with said first line;

means for respectively integrating data from said set of cone-beam projection data along said first and second lines, to generate first and second weighted line integrals, respectively corresponding to said first and second lines;

means for dividing the difference between said first and second weighted line integrals by a second angle geometrically related to said first angle to provide the Radon derivative of the corresponding planar integral;

means for computing respective values of said planar integrals in said planar integral set from said Radon derivatives; and means for using said planar integral values to perform an inverse Radon transform to construct an image of said object.

9. The apparatus of claim 8 including:

for a given first line having a portion intersecting said projected image, means for determining the position of the centroid of said given first line with respect to said projected image, and for locating the selected point corresponding to said first line at said centroid position.

10. The apparatus of claim 8 including:

means for estimating the region of support of said projected image on said detector plane for a given view angle of said computed tomography system; and means for selecting said rotation point to lie on a portion of said first line which is included in said region.

* * * * *